March 8, 1949.

C. M. TUTTLE ET AL
AUTOMATIC EXPOSURE CONTROL
FOR PHOTOGRAPHIC PRINTERS 2,464,162

Filed March 21, 1945

CLIFTON M. TUTTLE
RANDLE V. CARTWRIGHT
HARRY P. EICHLER
INVENTORS

BY
ATTORNEYS

March 8, 1949.

C. M. TUTTLE ET AL
AUTOMATIC EXPOSURE CONTROL
FOR PHOTOGRAPHIC PRINTERS 2,464,162

Filed March 21, 1945

CLIFTON M. TUTTLE
RANDLE V. CARTWRIGHT
HARRY P. EICHLER
INVENTORS

BY

ATTORNEYS

CLIFTON M. TUTTLE
RANDLE V. CARTWRIGHT
HARRY P. EICHLER
INVENTORS

Patented Mar. 8, 1949

2,464,162

UNITED STATES PATENT OFFICE 2,464,162

AUTOMATIC EXPOSURE CONTROL FOR PHOTOGRAPHIC PRINTERS

Clifton M. Tuttle, Randle V. Cartwright, and Harry P. Eichler, Rochester, N. Y., assignors to Eastman Kodak Company, Rochester, N. Y., a corporation of New Jersey Application March 21, 1945, Serial No. 583,966

10 Claims. (Cl. 88—24)

The present invention relates to photographic printers, and particularly to an automatic exposure control unit for use therewith.

Automatic exposure controls for photographic printing apparatus are well known. Some are based on a variable time characteristic and are known as variable time-constant intensity control systems. Others are based on variable light intensity and constant time and are known as variable intensity-constant time systems. Then there are those which may use both a variable time of exposure and a variable intensity of light, but two variables are not readily adapted to automatic operation.

The present invention is particularly directed to projection printers of the continuous type so that the exposure time is constant and, consequently, any desired variation in exposure must be made by varying the intensity of the printing beam. The intensity of the printing beam may, in general, be varied in three different ways: (1) by means of an adjustable diaphragm in the projection lens, (2) by means of a rotatable density wedge in the printing beam, and (3) by means of an adjustable resistance in series with the light source. While each of these three ways of varying intensity are applicable, the last of the three is not particularly adapted to continuous printers which have a fairly high film and paper feed because the intensity of conventional lamps cannot be made to respond fast enough to change in resistance to give accurate and reliable exposure control.

The present invention was primarily designed for use in the V-mail program now used by the Government and will be disclosed in connection therewith, although it will be appreciated by those skilled in the art that its usefulness is not limited to this application or the particular type of printer used in this program. In the V-mail program the letter is first written on a prescribed V-mail form, available in almost any store, which folds up into an envelope for mailing. These forms are received at a processing station where they are fed through a reproducing machine and are photographed onto a 16-mm. film strip and shipped overseas as a roll of film. These letters are reduced in size approximately fourteen times during this photographic operation and approximately 1800 letters can be put on a 100-foot roll of film. When the film is received at the processing station overseas it is fed through a continuous projection printer, or enlarger, and each frame is printed about eight times magnified successively onto a strip of sensitve paper. The exposed roll of paper is then fed through a processing machine where the letters are processed and then the individual letters are chopped from the web and mailed on to the party to whom they are addressed.

Since the exposure time used in printing and the processing time used in processing the print are constant, and thus have been based upon an average negative, considerable difficulty has been encountered in obtaining satisfactory and legible final prints. Under- and overexposed prints, which have to be individually re-printed with a corrected exposure, are a common occurrence and one which has so overburdened the processing stations that as a result many letters have been sent out which are far from satisfactory but could be read with difficulty.

There are many uncontrollable factors entering into the V-mail program which make it impractical to use a constant printing exposure and constant processing time. To mention only a few of them: First, manufacturers of V-mail forms do not use the same grade of paper with the result that some of the forms are a distinct yellow or off-white color instead of being white as they are supposed to be. This results in the background density and the contrast of the writing as compared with the background to vary over wide limits and affect the density of the negative when the form is photographed. Secondly, some of the out-lying V-mail stations have to rely upon motor driven generator sets to supply the lights of their reproducing machines so that the original exposures of the film on a single roll will vary with voltage in the photographing lights, and the film from one station may be spliced to that of another station prior to the printing step. Third, although a pen and black ink or a medium hard black pencil is recommended for writing V-mail letters, writing is encountered which varies all the way from that made with a stub pen and black ink to that written with a very sharp, hard pencil so that contrast difficulties are encountered. It will thus be seen that it is almost imperative that the continuous enlarger used in the V-mail program have some sort of automatic exposure control in order that uniform prints will be available at the rapid rate at which they must be produced.

One object of the present invention is to provide a printing apparatus having an automatic exposure control by the use of which uniform prints will be obtained despite variations in the density of the film negatives.

Another object is to provide an apparatus of the type set forth which works on the variable intensity-constant time exposure principle.

A further object is to provide a printer of the type set forth which is continuous in operation, and an exposure control which is sufficiently rapid in response so that the scanning station can be situated immediately adjacent, or forms a part of, the printing station.

And another object is to provide an automatic exposure control which can be supplied as an accessory to existing printers and will require a minimum number of changes in the printer itself and can be readily combined therewith.

And yet another object is to provide a printer having an automatic exposure control unit which is purely electro-optical as distinguished from the prior art controls of a similar nature which rely upon the predetermined movement of certain mechanically driven parts.

And another object is to provide an apparatus of the type set forth in which the scanning system is such that it scans only the margins of the film being printed so that the exposure is based on the background density of the film; or the scanning system can be adapted to cover a part of the subject matter on the film, as well as the clear margins, so that a measure of contrast control in printing is effected by the exposure control unit.

Another object is to provide a printer of the type set forth having a reversible driving motor for varying the intensity of the printing light and the control unit includes an electronic circuit responsive to the intensity of the light passing through the negative for determining when, in what direction, and how long the motor is to be operated to effect a given exposure with negatives of different density.

Another object is to provide an electronic control circuit of the type set forth which is easily adjusted as to sensitivity and range of response and which can be easily and rapidly balanced in operating conditions.

The novel features that we consider characteristic of our invention are set forth with particularity in the appended claims. The invention itself, however, both as to its organization and its methods of operation, together with additional objects and advantages thereof, will best be understood from the following description of specific embodiments when read in connection with the accompanying drawings in which.

Like reference characters refer to corresponding parts throughout the drawings.

Briefly, the present invention relates to a printer in which the exposure is of constant time and is varied by changing the intensity of the printing light. The intensity is controlled by a reversible motor whose direction of drive determines whether the intensity increases or decreases, and the duration of the drive of which determines the degree of intensity change. The excitation of the respective field windings of the reversible motor is controlled by a pair of gaseous discharge tubes connected in push-pull relation. The grid voltage on this trigger circuit is controlled by a phase-inverting balanced bridge electronic circuit, one arm of the bridge of which is the light sensitive tube which is part of the scanning system of the printer. The printing beam is scanned by two spaced mirrors disposed at the edges of the projected image beam in advance of, and adjacent to, the exposure slit. These mirrors intercept only the light passing through the unobstructed margins of the negative, or light passing through the margins and a part of the image, and direct it onto the light sensitive cell. So long as the intensity of the light striking the cell is a value for which the circuit is balanced the reversible motor will be idle. Just as soon, however, as the intensity of the printing beam varies from the selected value, the light sensitive cell will vary in resistance and will cause the proper gaseous discharge tube to trip and cause the motor to drive in the proper direction by a sufficient amount to bring the intensity of the printing beam back to the desired value.

Figure 1:
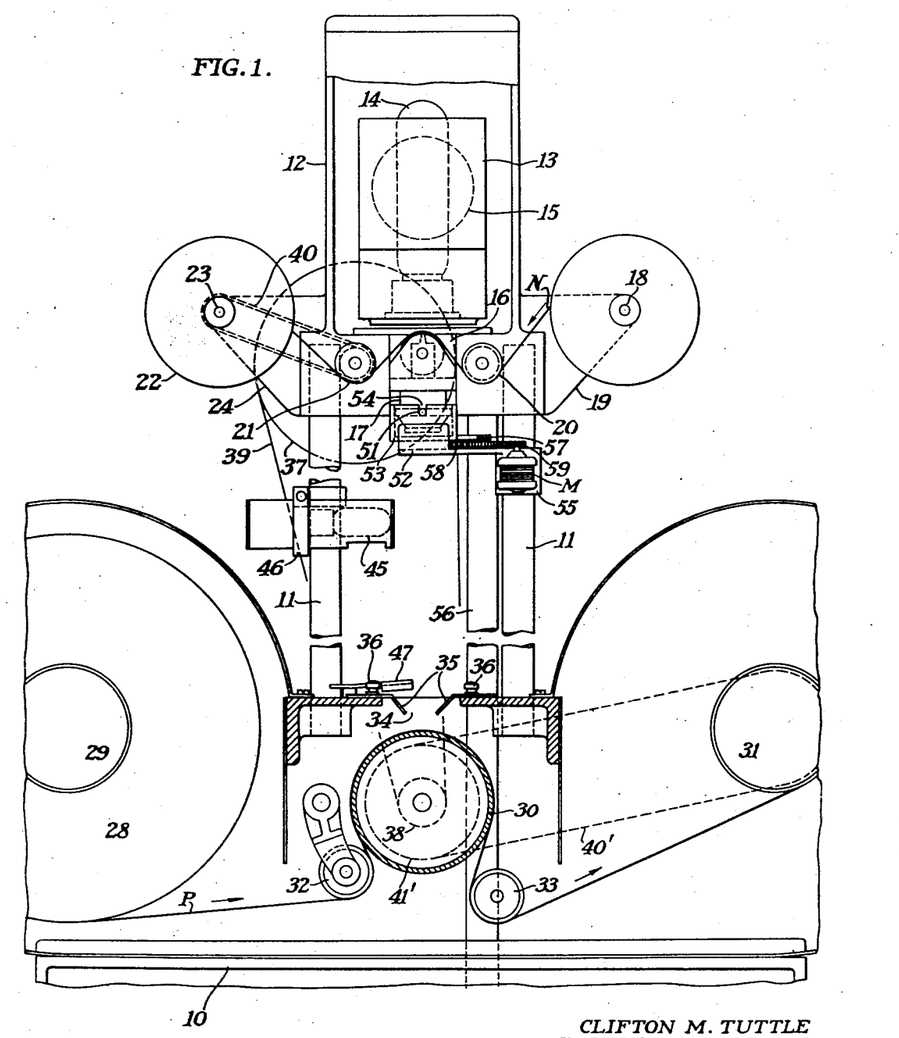
Fig. 1 is a front elevational view of a typical continuous projection printer with which our novel automatic exposure control is combined.
Figure 2:
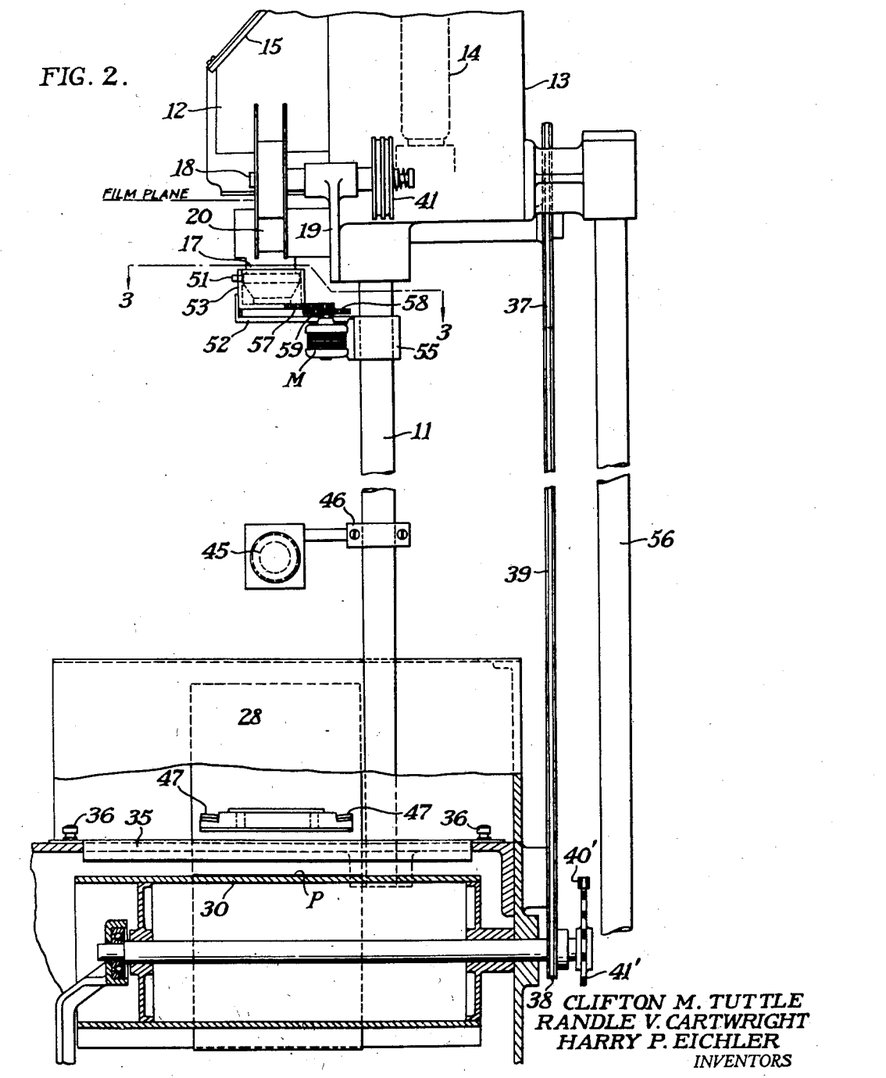
Fig. 2 is a side elevation of the printer shown in Fig. 1.
Figure 7:
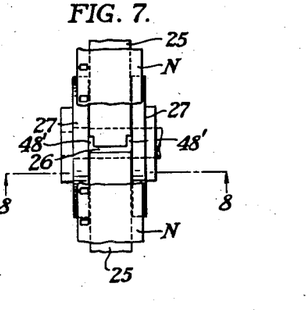
Fig. 7 is a plan view of the film gate of the printer showing how the gate aperture must be modified to cooperate with the scanning mirrors of the exposure control unit.
Figure 8:
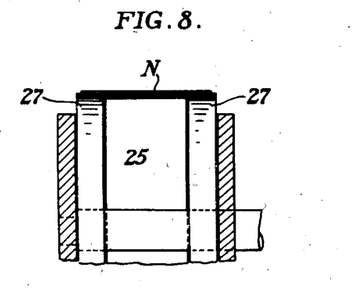
Fig. 8 is an enlarged view, partly in section and partly in elevation, taken substantially on line 8—8 of Fig. 7.

Referring now to the drawings, wherein a specific embodiment of the present invention is shown for disclosure purposes, in Figs. 1 and 2 there is shown a continuous projection printer comprising a base 10 on which a pair of vertical posts 11 and a third vertical post 56 are supported. Slidably supported on the posts 11 and 56 is a projection head, indicated generally at 12, and including a lamphouse 13 in which a printing lamp 14 is mounted and whose rays are reflected downwardly by a mirror 15 and through a horizontal film gate 16 and thence through a projection lens 17. The roll of film to be printed is mounted on a supply spindle 18 carried on a bracket 19 extending from the projection head to one side of the film gate. The film N is threaded from the supply roll over a guide roll 20, through the film gate 16, and over a rubber covered drive roller 21, and finally onto the take-up spool 22. The take-up spool 22 is mounted on a take-up spindle 23 carried on a bracket 24 extending from the projection end on the other side of the film gate, or on the left looking at Fig. 1. The film gate 16 comprises a stationary curve member 25 provided with a printing slit 26, of the shape best shown in Fig. 7, which is bounded on each side by freely rotatable flanged rollers 27 which are adapted to be engaged by the margins of the film N only outside of the frame areas. It will thus be seen that as the film is fed continuously across the printing slit 26 that at any instant a beam of light the shape of the slit will be directed through the lens and will be projected thereby in magnified relation onto a sheet of sensitive paper moving beneath an exposure slit. The printing slit in the present instance is made U-shaped rather than straight, as is the usual procedure in continuous printers, to form a part of the novel scanning system which forms a part of our new exposure control unit as will be fully hereinafter described.

The supply roll of light sensitive paper 28 is mounted on a supply spindle 29 rotatably supported on the base 10 below and to the left of the projection head 12, looking at Fig. 1, and the paper P is fed over a rubber-covered drive roller 30 to a take-up reel mounted on a take-up spindle 31. The paper P is held in approximately a 120-degree wrap with the drive roller 30 by a pair of guide rollers 32 and 33, the first of which is pivotally mounted and under spring tension. The drive roller 30 in addition to serving to feed the paper at a known speed past the printing station, serves to hold the paper taut beneath an exposure slit 34 through which the magnified projected image is directed onto the paper as is well known. The paper is completely enclosed in a light-tight housing at all times and the exposure slit 34 is the only opening in said housing. The exposure slit is defined by two in-turned masks 35, at least one of which is adjustably mounted at the top of the light-tight housing by adjustable thumb-screws 36 so that the width of the exposure slit may be adjusted to accommodate the magnified image of the printing slit 26.

As is well known to those skilled in the art, in a continuous printer it is necessary to feed the film and paper in opposite directions and at relative speeds equal to the magnification factor being used. To this end, the drive roll 21 for the film and the drive roll 30 for the paper are adapted to be driven by sprockets 37 and 38 fixed to the shafts of the respective rolls and connected together by chain 39. If the printer is set up for an 8:1 magnification, the diameter of the sprocket 38 connected to the paper drive roller 30 will be ⅛ of that of the sprocket connected to the film drive roller, or so that the paper will be fed eight times as fast as the film and in the opposite direction. The sprockets may be driven by a constant speed motor (not shown), at a speed which will give a desired exposure time. The take-up spindle 23 of the film may be driven by a spring belt 40 running off of the shaft of the film driving roller, and the supply spindle 18 may be retarded by an adjustable friction brake, shown at 41 in Fig. 2, to prevent overdrive. Likewise, the take-up spindle for the paper may be driven by a chain 40', see Fig. 2, running over a sprocket 41' on the shaft of the drive roll 30 and a sprocket (not shown) on the take-up spindle. A chain drive, rather than a spring-belt drive, is recommended for the take-up spindle of the paper drive due to the fact that rather large rolls of paper are used and a considerable driving force is required to drive the same. However, a friction clutch should be provided in the drive so that as the diameter of the take-up roll increases, the paper will not be ruptured as the take-up roll tends to take up faster than the drive roll 30 is feeding the paper.

The printer construction described up to this point, with the exception of the special form of printing slit described, is well known to the art and constitutes no part of the present invention except insofar as it enters into combination with the automatic exposure control unit now to be described, and is described as showing the typical application for which the present exposure control unit was designed.

Figure 5:
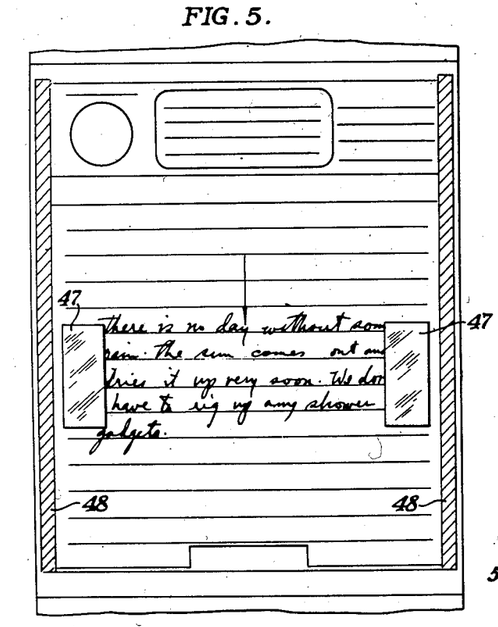
Fig. 5 is an enlarged plan view showing the preferred disposition of the scanning mirrors relative to the projected image; assuming, of course, that the image of a whole frame of film will be projected at once instead of only a narrow transverse portion at any one time as is actually the case in a continuous printer.

V-mail forms are well known, and one has been illustrated in Fig. 5 to point out the novelty and advantage of the scanning system used with the present exposure control. We have found that the best overall exposure control in printing this type of material is obtained if the background density of the negative is used to control the exposure, rather than using the average density of the entire negative and/or the density of a particular point of interest as is the common procedure in printing control. To this end, the scanning system of the present control comprises a light-sensitive cell 45 carried by a bracket 46 slidably mounted on one of the vertical posts 11 between the projection head 12 and the exposure slit 34 and to one side of the projected beam of light; a pair of elongated mirrors 47 mounted at opposite ends of, and adjacent to, the leading edge of the exposure slit 34 for reflecting portions of the projected beam onto the light-sensitive cell; and the specially formed printing slit 26 in the film gate which cooperates with said mirrors.

As shown in Figs. 2 and 5, the two mirrors 47 are located adjacent ends of the exposure slit and consequently adjacent the margins of the printing paper, and in such a position that they intercept those portions of the beam of light projected through the margins of the negative which are not written upon. In Fig. 5 the projected enlargement of a V-mail form is shown as it would be projected onto a flat surface and the mirrors 47 are shown in the position they would take in relation to the projected image. It will be observed that the writing does not ordinarily come completely over to the crosshatched side lines 48 of the letter form and that the mirrors 47 are disposed to intercept and reflect the light which would pass these portions of the negative. Consequently, the scanning system bases the exposure on the background density of the negative rather than on the average density thereof, or the density of the main point of interest as is the usual procedure in controlling the exposure of ordinary photographic negatives. As shown in Fig. 2, each of the mirrors 47 is inclined toward one another to reflect the light onto the light sensitive cell which is located between them.

It will be noticed that the mirrors 47 are located adjacent the exposure slit 34 but in front of the leading edge thereof so that the scanning operation, or scanning station, is in advance of the printing station. Applicants' exposure control unit is sufficiently rapid in response to permit such a close relationship of the scanning and printing stations. So that the light from the desired areas of the film negative will strike the mirrors 47 for scanning purposes the ends of the printing slit 26 of the stationary member 25 of the film gate 16 are provided with cut-out portions 48', see Fig. 7, which make the printing slit U-shaped rather than straight as is usual in continuous printers. The cut-out portions 48' in the printing slit 26 are on the trailing edges of the slit so that they will cooperate with the mirrors 47 to constitute a scanning operation immediately in advance of the printing operation on a given area of film as it moves through the printer.

It will thus be seen that the scanning system forming a part of the present novel exposure control unit can be readily supplied as, and applied to an existing printer as, an accessory for the reason that it necessitates only a change in the shape of the printing slit of the film gate to cooperate with the mirrors 47 and the light sensitive cell 45 which constitutes the remainder of the complete scanning system and are detachably connected to the printer in a desired relationship with the exposure slit.

Figure 6:
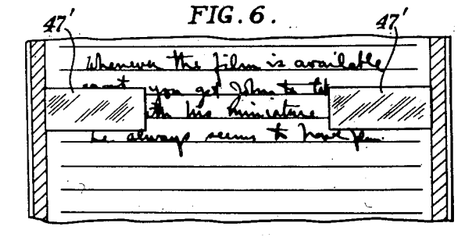
Fig. 6 is a partial view similar to Fig. 5 and showing another disposition of the scanning mirrors which is effective in giving some degree of contrast control to the written matter on the letter.

Basing the printing exposure control entirely on the background density of the film negative has been found to account for variation in original exposure of the film due to uncontrolled variations in voltage on the photographing lights and/or different hues of the original V-mail forms (different degrees of whiteness therein). Thus the major difficulties of exposure variations are overcome. It was noted, however, that this principle of scanning did nothing to control the contrast of the writing (which might be due to the alternate use of a sharp hard pencil and a stub pen using black ink) and at times even corrected the exposure in a direction to reduce the contrast. Somewhat by accident it was found that if the mirrors 47 extended into the projecting beam far enough to include some of the writing on the film, that the printing exposure called for by the density conditions resulted in a modification of the exposure which improved the contrast of the written material. The reason for this phenomenon is not known at the present time, but it is assumed that the increase in the measured density of the film introduced by including a part of the written material along with only the margins, modifies the printing exposure to balance the contrast between the background and the written material of the printed letter. This contrast control can be effected by leaving the mirrors 47 in the position shown in Fig. 5 and increasing their width to intercept a part of the written material, or better still, the mirrors 47 can be turned to the position shown at 47' in Fig. 6 so that they will cover both the margins of the letter and part of the written matter. With this arrangement of the mirrors it will be appreciated that the cut-out portions 48' of the printing slit would have to be made of such a shape and size as to cooperate therewith. With this last-mentioned disposition of the mirrors 47', the background density of the film will be the primary controlling factor of the printing exposure because the written matter actually constitutes only a comparatively small part of the entire area scanned. However, the slight change in measured density due to the written material does tend to alter the printing exposure to effect a desirable control of contrast in the print.

For varying the intensity of the printing beam we have shown the use of an adjustable diaphragm in the projection lens 17 because most projection lenses used on printers of this type include an adjustable diaphragm, or a lens including a conventional diaphragm can be obtained. As is well known to those skilled in the art, the projection lens mount may include an adjustable diaphragm 50 which may be opened and closed by oscillating a pin 51 fixed to the adjusting ring of the diaphragm and extending radially from the exterior of the mount. In accordance with the present invention this diaphragm is to be adjusted by a reversible motor whose direction and duration of operation is controlled by an electronic circuit of which the light sensitive cell 45, constituting a part of the scanning system, forms a part.

Figure 3:
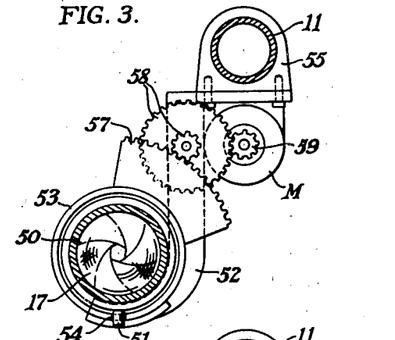
Fig. 3 is a sectional view taken substantially on line 3—3 of Fig. 2 and showing the drive for the adjustable diaphragm in the projection lens.

So that the present exposure control unit can be applied to existing printers as an accessory we have shown the drive for the diaphragm as constituting a bracket 52 rotatably supporting a sleeve 53 which is adapted to telescope with the lens mount. The upper end of the sleeve 53 includes one or more notches 54 into which the diaphragm adjusting pin 51 is adapted to slip so that as the sleeve is rotated the pin is rotated and the diaphragm is opened and closed. The notch in the sleeve 53 is made sufficiently deep so that the lens may be focused without disconnecting the pin from the sleeve or without adjusting the vertical position of the bracket 52. The bracket 52 is fixed to a tubular member 55 by means of which it is slidably mounted on the right hand post 11, looking at Fig. 1, extending between the base 10 and the projection head 12 of the printer. This bracket also supports a servomotor M which is mounted so that its drive shaft extends vertically. The servomotor is drivingly connected to the diaphragm adjusting sleeve through a reduction gearing including an arcuate gear segment 57 fixed to the sleeve 53, a pinion and gear combine 58 rotatably mounted on the bracket 52 and a pinion 59 connected to the motor shaft, all as clearly shown in Fig. 3. Consequently, when the motor drives in one direction the diaphragm is opened, and when it drives in the other direction the diaphragm is closed.

Figure 4:
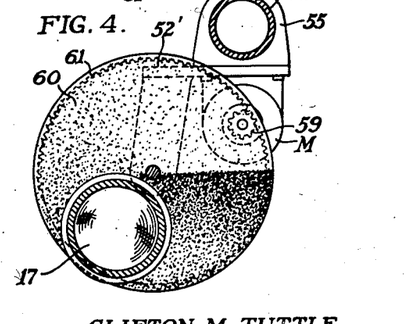
Fig. 4 is a view similar to Fig. 3 but showing a rotatable density wedge in place of the adjustable diaphragm for varying the intensity of the printing light.

Instead of using an adjustable diaphragm for varying the light intensity, a variable density wedge might be used, and in Fig. 4 there is shown such an embodiment. As shown, a circular density wedge 60 may be rotatably mounted on a bracket 52' which is the equivalent of the supporting bracket 52 above described, and the wedge may be positioned to intercept the light beam between the film gate and the projection lens. This wedge can have a large ring gear 61 connected thereto which is directly engaged by the pinion 59 on the shaft of the servomotor M. As the motor drives in opposite directions, the wedge is rotated to move a less dense or more dense portion thereof into the printing beam and thereby vary the intensity of the beam.

Figure 9:
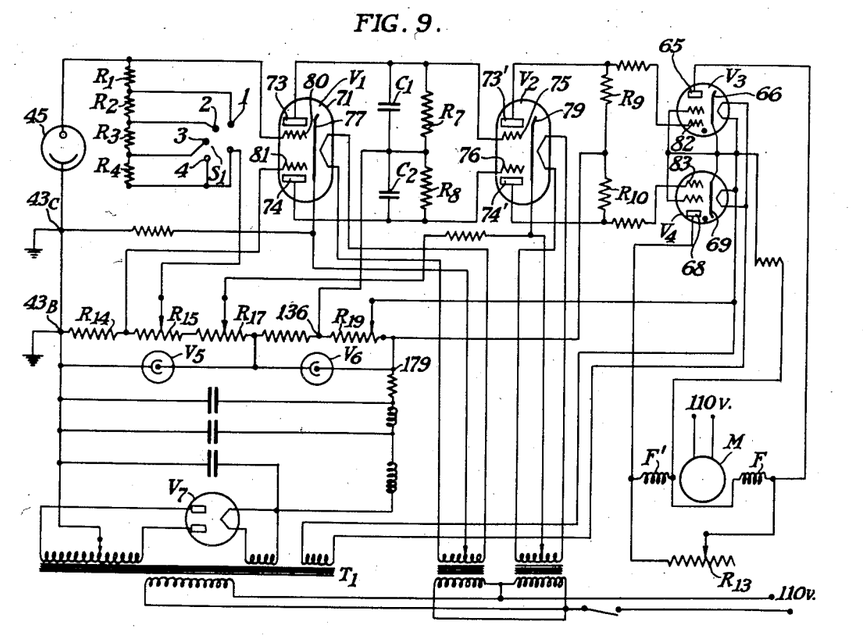
Fig. 9 is a schematic wiring diagram of one electronic control circuit which can be used for controlling the operation of the reversible motor of the diaphragm.
Figure 10:
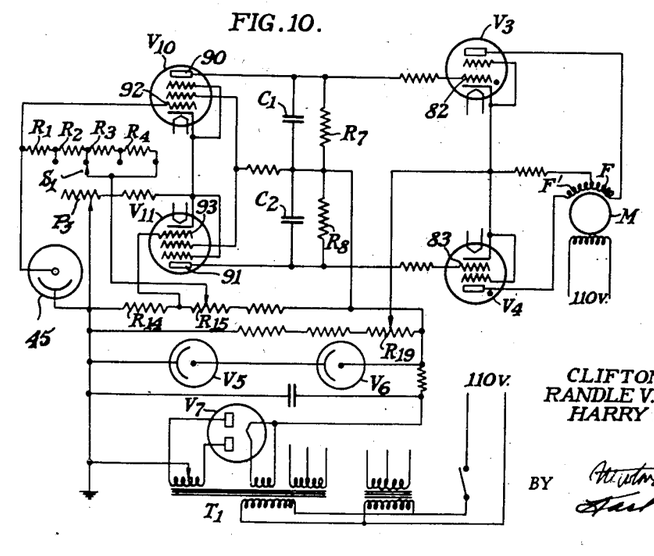
Fig. 10 is a schematic wiring diaphragm of another and more simple electronic control circuit which can be used.

With this printer the exposure time is constant and all exposure control must come about by varying the intensity of the printing beam. So long as the printing beam is of a given intensity the proper exposure will be obtained, but should the intensity increase or decrease with respect to this given value the servomotor must be started and driven in the proper direction and by the proper amount to close or open the diaphragm, or rotate the density wedge, to bring the intensity of the printing beam back to its desired value. While electro-mechanical means have been disclosed to accomplish this feat, so far as we are aware no commercially practical system of this type has been made. In accordance with the present invention this end is accomplished by the use of an electro-optical means, or by an electronic circuit including a light-sensitive cell which is part of the scanning system. This type of control is very responsive so that the scanning and printing stations can be placed immediately adjacent one another. In Figs. 9 and 10 we have shown the schematic wiring diagrams of the two different circuits which might be used to this desired end, and they will now be described in turn.

Referring first to the control circuit shown in Fig. 9, the servomotor M is connected to a 110 v. line and one field winding F of the motor is connected to the plate 65 and the cathode 66 of a gaseous discharge or thyratron tube $V_3$, while the other field winding F' of the motor is connected to the plate 68 and cathode 69 of a second gaseous discharge or thyratron tube $V_4$. These two thyratron tubes are connected in push-pull relation so that only one of them can fire at any one time. So long as the grid voltage on either of these tubes is sufficiently negative no current will flow through them or the field windings of the motor across which they are connected. Just as soon, however, as the grid bias of one of the tubes is driven positive by a certain value the tube will fire and the alternating current can flow through the motor winding it controls. Since the two thyratrons are coupled so that as the grid bias on one goes positive that on the other goes more negative, it is impossible for both tubes to fire at once. Consequently, one tube controls the clockwise drive of the motor while the other tube controls the counter-clockwise drive of the motor.

The input grid voltage, or grid bias of the two thyratron tubes $V_3$ and $V_4$ is controlled by a phase-inverting two-stage amplifier circuit consisting of vacuum tubes $V_1$ and $V_2$. These tubes are identical and are shown as twin triode amplifiers commonly known as 6SC7 tubes. It will be noticed that the respective plates 73 and 74 of the first amplifier $V_1$ are connected to the respective plates 75 and 76 of the second amplifier $V_2$ so that a two-stage amplifier with direct coupling is provided. The two plates of the last amplifier $V_2$ are connected to the respective grids of the thyratrons $V_3$ and $V_4$, respectively, so that the alternating plate currents of the second amplifier controls the grid bias of the thyratrons.

The power pack of the control circuit comprises a step-up transformer $T_1$ connected in a 110 v. A. C. feeder and in circuit with which there is connected a full wave high vacuum rectifier tube $V_7$ which for the present application is adapted to supply a direct current potential of about 300 v. The output of the rectifier is smoothed out in a well known manner by the use of choke condensers (L-section) shown. The tube voltages of the circuit are taken off of a voltage divider including resistances $R_{14}$, $R_{15}$, $R_{17}$, $R_{18}$, and $R_{19}$, the voltages in the separate sections of which are kept constant by voltage regulating tubes $V_5$ and $V_6$ in a well-known manner. The two plates 73 and 74 of the tube $V_1$ are connected to the voltage divider at point 136 while the common cathode 77 of this tube is connected to the zero side of the voltage divider at point 43—B through a resistor. The two plates 73' and 74' of the tube $V_2$ are connected to the high side of the divider at point 179 while the common cathode 79 of this tube is connected to the voltage divider through the potentiometer $R_{17}$.

The anode of the light-sensitive cell 45 is connected to the control grid 80 of tube $V_1$ and is connected to the voltage divider through the potentiometer $R_{15}$. By means of a rotary switch $S_1$ one or more of the four resistances $R_1$, $R_2$, $R_3$, or $R_4$ can be connected in parallel with the light cell across the grid 80 of the tube $V_1$. This series of resistances is provided so that the circuit can be adjusted for use with any one of four different grades of light-sensitive paper and the switch has four positions numbered 1 to 4 corresponding with the four grades of sensitive paper which may be used for printing. The cathode of the light cell is connected to the input at point 43—B. Inasmuch as light cell 45 is located rather remotely from the circuit per se and is connected thereto by a rather long cable, the cable is shielded and separately grounded, as indicated at 43—C to prevent the grid voltage on $V_1$ from being affected by stray capacitances. This step is necessary because the cable is connected directly to the grid of tube $V_1$ and is in effect a continuation of the grid. The control grid 81 of the tube $V_1$ is connected to the voltage divider through the biasing resistance $R_{14}$. Now, since a light cell is in reality a resistance which varies inversely as the intensity of the light incident on it, it will be noticed that the control grids 80 and 81 of the tube $V_1$ are connected in the equivalent of a bridge circuit the respective arms of which are the light cell 45, one or more of the resistances $R_1$, $R_2$, $R_3$, and $R_4$ controlled by the rotary switch $S_1$, the resistance $R_{15}$ and the resistance $R_{14}$.

When the bridge is in balance, due to a chosen intensity of printing light falling on the light cell 45, the same bias will be placed on each of the control grids of tube $V_1$ and plate current will flow from the two plates 73 and 74 thereof. Since each of the plate resistors $R_7$ and $R_8$ are equal this means that the same grid bias will be placed on the two grids of tube $V_2$ and so on to the grids of the two gaseous discharge tubes $V_3$ and $V_4$ so that the thyratrons will remain at cut-off and no current will flow through either of the motor windings and the motor will stay still.

Let us assume that the negative passing through the film gate is more dense than that selected for proper exposure conditions. This will cause the intensity of the printing beam to drop below the selected value for which the circuit has been balanced. This drop in intensity will be picked up by the light cell and its resistance will rise and less current will flow from the anode thereof with the result that the voltage applied to the grid 80 of tube $V_1$ will increase. This will result in the current of plate 73 of tube $V_1$ increasing so that the voltage drop across the plate resistance $R_7$ will increase with a resultant decrease in plate voltage at 73. At the same time, due to common cathode coupling of tube $V_1$, the voltage applied to grid 81 of the tube $V_1$ will decrease, but the current of plate 74 will also decrease and the voltage drop across plate resistance $R_8$ will decrease with a resultant increase in plate voltage at 74. Consequently, since the plates 73 and 74 are connected directly to the grids 75 and 76 of tube $V_2$, the voltage on grid 75 will decrease, the current of plate 73' will decrease, and the voltage drop across the plate resistance $R_9$ will decrease. This will cause the voltage on the grid 82 of the thyratron $V_3$ to increase, or become less negative, and the tube will fire to allow alternating current to flow through the field winding F of the motor M so that the motor will operate in one direction. At the same time, the voltage on the grid 83 of thyratron tube $V_4$ will decrease and become more negative so that the tube will remain at cut-off. The thyratron tubes will be so connected to the field windings of the motor M, and/or the gearing between the motor and the diaphragm adjusting sleeve 53 will be such, that this condition will cause the motor to open the diaphragm to permit an increase in the intensity of the printing beam. The motor will continue to drive the diaphragm open until the intensity of the light is such that the resistance of the light cell 45 is brought back to the value necessary to balance the circuit. When this occurs, the output of the two branches of the amplifier stage will be balanced, and the bias on the grid 82 of the thyratron V₃ will be reduced to cut-off to stop the motor M. At the same time the bias on grid 83 of thyratron V₄, as well as the bias on all of the grids of the other tubes, will be brought back to their initially adjusted values.

It will now be appreciated that if a less dense negative now passes through the gate and the intensity of the printing beam increases above the selected value immediately the plate current of the light cell will increase and the voltage on the grid 80 of tube V₁ will decrease so that now the current of plate 73 decreases. At the same time the voltage on grid 81 will increase with a resultant increase in the current of plate 74. Following this set of conditions through the complete circuit as was done above it will be seen that the relationship of the voltage on the grids of the thyratron tubes V₃ and V₄ is reversed and tube V₄ now fires to cause the motor M to drive in the opposite direction to close the diaphragm, while the grid bias on tube V₃ becomes more negative and the tube remains at cut-off. Again this condition will persist until the diaphragm has been closed sufficiently to bring the intensity of the printing beam back to the selected value at which time the circuit will become balanced and both thyratrons will be biasly to cut-off to stop the motor.

This exposure control unit is very rapid in its response as evidenced by the proximity with which it is possible to place the scanning station with respect to the printing station. The potentiometer R₁₅ is referred to as the range adjustment because it is adjusted in balancing the bridge controlling the input voltages of the grids 80 and 81 of the tube V₁ so that the current of the plates 73 and 74 are equal at a selected intensity of the printing beam. The potentiometer R₁₇ is provided so that the two grid biases on tube V₂ can be balanced for changes in the tube V₁. By adjusting potentiometer R₁₉ the cut-off grid bias of the thyratron tubes can be adjusted and the sensitivity of response of the tubes can thus be varied.

The motor M tends to continuously hunt. To eliminate, or reduce, this "hunting" tendency of the motor a damping control is provided in the form of an adjustable resistant R₁₃ connected across the field windings of the motor M, by-passing more current with decreased resistance and thus slowing down the motor movement. While this magnetic braking effect tends to make the control somewhat sluggish in its response, this is an advantage rather than a disadvantage in that it prevents the device from attempting to correct for insignificant changes in printing intensity resulting from regular or irregular minor changes in negative density, and which changes might be referred to as "flicker" changes. There is a frame line between each letter on a roll of paper which prints black or substantially so. This means that the negative at these points will be substantially clear and that the intensity of the printing beam will increase to a maximum as these frame lines pass through the gate and the motor drive would tend to drive the diaphragm rapidly against one of its stops to correct for this intensity change if nothing was done about it. To account for these regular changes in intensity due to the frame lines, etc. condensers C₁ and C₂ are connected in parallel with the plate resistors R₇ and R₈. These condensers are computed to introduce a lag in the circuit just sufficient to account for the abrupt and short duration changes in intensity due to the frame lines and will not make the circuit so sluggish that it will not respond to changes in negative density of significant duration or extent over the area of the same.

While the above described electronic control circuit for the motor was found to be thoroughly satisfactory and commercially practical for certain permanent installations, it was found to be impractical for field installations, or installations where the equipment is subjected to considerable movement and was to be handled by unskilled operators. Furthermore, it was found to be a little difficult to initially balance this circuit. One of the major drawbacks of this circuit was the fact that the two stages of amplification made it extremely sensitive so far as initially balancing the same, and holding it in balance, was concerned. For example, if for any reason one of the amplifier tubes blew out in the field the complete circuit had to be rebalanced when a new tube was inserted due to the sensitivity of the circuit. In addition, since all of the resistances of the input voltages of the several tubes are in a single voltage divider, the adjustment of any one has a tendency to upset the previous setting of another which was made to balance a particular part of the circuit.

Having found that sufficient amplification could be obtained with a single stage if television pentode tubes (6AC7) were used, the control circuit shown in Fig. 10 was devised. While this circuit is basically the same as that shown in Fig. 9, and does the same job as satisfactorily as the circuit described, it possesses certain differences which makes it simpler, more easy to initially balance, and less easy to throw out of adjustment, and consequently more suited to field applications.

The control circuit shown in Fig. 10 will now be described, and where the parts are the same as those in the circuit of Fig. 9, both in function and physical construction, they will be referred to by the same reference characters as used in describing the circuit of Fig. 9. Servomotor M is controlled as before by two gaseous discharge tubes or thyratron tubes V₃ and V₄. These tubes are connected in push-pull relation and the flow of alternating current through one field winding F of the motor is controlled by the tube V₃, while the flow of current through the field F' is controlled by the tube V₄. In this circuit two single and identical amplifier tubes V₁₀ and V₁₁ are used to control the grid voltages on the respective thyratrons V₃ and V₄, and these tubes are connected in phase-inverting and push-pull relation as shown. We have found that television pentode tubes (commonly known as 6AC7 tubes) will give ample amplification and can be used as tubes V₁₀ and V₁₁. The plate 90 of tube V₁₀ is connected directly to the control grid 82 of the thyratron V₃, while the plate 91 of tube V₁₁ is connected directly to the control grid 83 of thyratron V₄ so that the alternating plate currents of the two tubes V₁₀ and V₁₁ control the grid voltages on the tubes V₃ and V₄, respectively, and determine which one is to fire and when.

As in the previous circuit, the control grid 92 of the tube V₁₀ is directly connected to the anode or plate of the light-sensitive cell 45 while the control grid 93 of tube V₁₁ is connected to the voltage divider of the power pack across the biasing resistance $R_{14}$. As before, the plate of the light cell is connected to the voltage divider through the potentiometer $R_{15}$. By means of a rotary switch $S_1$ one or more of the four resistances $R_1$, $R_2$, $R_3$, and $R_4$ can be connected in parallel with the light cell across the grid 92 of tube $V_{10}$. As pointed out above, this series of resistances is provided so that the circuit can be adjusted to be used with any one of four different grades of light-sensitive paper. As before, the control grids 92 and 93 of tubes $V_{10}$ and $V_{11}$, respectively, are connected in the equivalent of a bridge circuit the respective arms of which are the light cell 45, one or more of the resistances $R_1$, $R_2$, $R_3$, and $R_4$ controlled by the rotary switch $S_1$, the resistance $R_{15}$ and the resistance $R_{14}$.

When the bridge is in balance the same grid bias will be on each of the tubes $V_{10}$ and $V_{11}$ and equal plate currents will flow from the respective plates thereof. If equal plate resistors $R_7$ and $R_8$ are provided for the respective tubes, this means that the same grid bias will be placed on the thyratrons so that they will remain at cut-off and the motor will remain still.

If the intensity of the printing light should increase above the value for which the circuit is balanced, the grid voltage on the tube $V_{10}$ will decrease while that on the other will increase by the same amount with the result that the plate currents of the two tubes will vary in opposite directions by the same amount and the grid voltages applied to tubes $V_3$ and $V_4$ will vary in opposite directions by the same amount. This will mean that the thyratron which has a positive voltage applied will be caused to fire while the other will go more negative and remain at cut-off. The tube which allows the current to flow in the field of the motor causing it to drive in a direction to close the diaphragm will be the one to fire under the conditions specified. If the intensity of the printing light should decrease below the value for which the circuit is balanced, the relationship of the plate currents of tubes $V_{10}$ and $V_{11}$ and grid voltages of tubes $V_3$ and $V_4$ will be reversed so that the opposite tube will fire and the motor will be driven in the direction to open the diaphragm.

One significant change in the circuit of Fig. 10 over that of Fig. 9, other than the use of one stage amplification, is that the voltage divider is broken into two lines so that the potentiometer $R_{19}$ controlling the cathode bias on the thyratron tubes is not in series with the resistances $R_{14}$ and $R_{15}$ controlling the input on the light cell 45 and tubes $V_{10}$ and $V_{11}$. Consequently, the adjustment of the potentiometer $R_{19}$ will not upset any previous adjustment of resistances $R_{14}$ and $R_{15}$ made in balancing the bridge circuit or vice versa. The use of a single stage of amplification also makes it possible to omit certain of the filter condenser and choke combinations found necessary in the power pack when using the two stages of amplification for smoothing out the ripple in the supply.

Another significant difference in the circuit of Fig. 10 over that of Fig. 9 is the addition of the potentiometer $P_3$ in the cathode circuit of tubes $V_{10}$ and $V_{11}$. This potentiometer makes possible changes in the cathode bias on the input stage, and since it changes the amplification of the tubes $V_{10}$ and $V_{11}$ it can be used to control the amount of diaphragm swing per unit change of light intensity.

Although we have shown and described certain specific embodiments of our invention, we are fully aware that many modifications thereof are possible. Our invention, therefore, is not to be restricted to the specific details and construction shown and described but is intended to cover all modifications coming within the scope of the appended claims.

Having thus described our invention what we claim as new and desire to secure by Letters Patent of the United States is:

1. In a photographic continuous projection printer having a printing station comprising a film gate comprising a transverse printing slit across which a negative film is adapted to be continuously fed and a transverse exposure slit spaced from said gate across which a web of light-sensitive paper is adapted to be continuously fed in a direction opposite to that of the film feed, means for projecting an image on said negative film onto said paper including a light source behind said gate and a projection lens in front of said gate and means for varying the intensity of said printing light beam including a part driven in opposite directions to increase and decrease said intensity; means for automatically altering the intensity of the printing beam in accordance with the density of the negative as it moves into the printing station in order to obtain a given exposure of the paper, said means including a reversible electric motor for driving said part, an electronic control circuit for controlling when, how, and by how much the intensity of the beam should be varied and including a pair of electronic or vacuum tubes connected in push-pull relation, one of said tubes connected in circuit with one field winding of the motor and the other tube connected in circuit with the other field winding of the motor, an amplifier phase-inverting bridge circuit connected to the control grids of said tubes to control the input voltage thereon, whereby the input voltage on said tubes varies in opposite directions and the direction of the motor drive is thereby determined, a light-sensitive cell arranged to be effected by the light beam projected onto said sensitive paper, constituting one side of said bridge circuit and adapted to balance said bridge when the printing beam is of given intensity, said cell disposed between said gate and exposure slit to one side of said printing beam; and a reflector adjacent the leading edge of the exposure slit for reflecting a given portion of the projected light beam onto said light-sensitive cell.

2. A projection printer according to claim 1 in which said bridge circuit includes a stage of amplification of the output current of the cell.

3. A projection printer according to claim 1 and including means for varying the resistance in the input circuit of the cell to adjust the bridge circuit in accordance with papers of different sensitivity.

4. A projection printer according to claim 1 and including a potentiometer for varying the cathode bias on the input stage of the amplifier tubes of the bridge circuit to change the amplification and thereby alter the degree of drive of the motor per unit change in light intensity.

5. A projection printer according to claim 1 and including a potentiometer for adjusting the cathode bias on said electronic tubes to adjust their firing point.

6. A projection printer according to claim 1 and including a potentiometer for varying the cathode bias on the input stage of the amplifier tubes of the bridge circuit, and a potentiometer for adjusting the cathode bias on said electronic tubes, each of these potentiometers connected in parallel in the power pack of the system so that an adjustment of one in initially adjusting a part of the circuit will not be upset by the subsequent adjustment of the other for adjusting another part of the circuit.

7. In a continuous projection printer the combination with a printing station comprising a film gate having a narrow transverse printing slit across which a negative film is adapted to be continuously fed; a transverse exposure slit beneath which a light sensitive paper is adapted to be continuously fed in a direction opposite to that of the film feed; a printing light and means for directing rays thereof through said film gate and through said exposure slit; and means for varying the intensity of the printing beam in accordance with changes in density of the film to obtain a given exposure of the sensitive paper; of a scanning station immediately adjacent and in advance of the printing station, and comprising a light sensitive cell disposed between the film gate and the exposure slit and to one side of the printing beam; a pair of mirrors disposed at the ends of said exposure slit and immediately in advance of the leading edge thereof and arranged to reflect light onto said cell; opposite ends of the trailing edge of said printing slit, across which the margins of the frame areas of the film are adapted to overlie, cut away in the direction of movement of the film to cooperate with said pair of mirrors, said cut-away portions of said slit being of such size and so disposed that they permit passage of two portions of the printing beam passing through the margins of the film frame areas to strike said mirrors; and means connected to said cell for responding to changes in film density with respect to a chosen density value and instigating corrections in the exposure to correct for such changes.

8. In a photographic projection printer the combination with a film gate, means for feeding a negative film across said gate, an exposure slit spaced from said gate, means for feeding a light-sensitive paper across said slit, a light source behind said gate, a projection lens for directing an image of the negative in said gate through said exposure slit and onto the paper, means for altering the intensity of the printing beam of light in accordance with the density of the negative in the gate in order to obtain a given exposure of the paper, and including a part which, when driven in one direction, increases the intensity of the printing beam, and when driven in the other direction, decreases its intensity, a normally inoperative reversible driving means for said last-mentioned part, of an electrical control circuit connected to said driving means for determining when, in what direction and how long said driving means is to be operated, said circuit including a light-sensitive cell disposed between said gate and exposure slit to one side of the projected light beam, and a pair of reflectors located adjacent each end of the leading edge of said exposure slit adapted to reflect portions of the light beam onto said light-sensitive cell.

9. In a photographic projection printer the combination with a film gate, means for feeding a negative film across said gate, an exposure slit spaced from said gate, means for feeding a light-sensitive paper across said slit, a light source behind said gate, a projection lens for directing an image of the negative in said gate through said exposure slit and onto the paper, means for altering the intensity of the printing beam of light in accordance with the density of the negative in the gate in order to obtain a given exposure of the paper, and including a part which, when driven in one direction, increases the intensity of the printing beam, and when driven in the other direction decreases its intensity, a normally inoperative reversible driving means for said last-mentioned part, of an electrical control circuit connected to said driving means for determining when, in what direction and how long said driving means is to be operated, said circuit including a light-sensitive cell disposed between said gate and exposure slit to one side of the projected light beam, means including a pair of reflectors located adjacent the leading edge of said exposure slit for directing two portions of said light beam onto said light-sensitive cell, each of said reflectors being relatively narrow and shorter than one-half the length of said slit and disposed so that they are lengthwise of the exposure slit at opposite ends thereof and each extends only part-way into opposite sides of the projected image, whereby the light-sensitive cell monitors the density of the negative at its lateral margins and the contrast of the image is corrected for.

10. In a photographic projection printer the combination with a film gate, means for feeding a negative film across said gate, an exposure slit spaced from said gate, means for feeding a light-sensitive paper across said slit, a light source behind said gate, a projection lens for directing an image of the negative in said gate through said exposure slit and onto the paper, means for altering the intensity of the printing beam of light in accordance with the density of the negative in the gate in order to obtain a given exposure of the paper, and including a part which, when driven in one direction, increases the intensity of the printing beam, and when driven in the other direction decreases its intensity, a normally inoperative reversible driving means for said last-mentioned part, of an electrical control circuit connected to said driving means for determining when, in what direction and how long said driving means is to be operated, said circuit including a light-sensitive cell disposed between said gate and exposure slit to one side of the projected light beam, an opaque reflector adjacent the leading edge of the exposure slit adapted to reflect a given portion of the projected light beam onto said light-sensitive cell.

CLIFTON M. TUTTLE.
RANDLE V. CARTWRIGHT.
HARRY P. EICHLER.

REFERENCES CITED

The following references are of record in the file of this patent:

UNITED STATES PATENTS

| Number | Name | Date |
|---|---|---|
| 2,032,633 | Riszdorfer | Mar. 3, 1936 |
| 2,100,672 | Riszdorfer | Nov. 30, 1937 |
| 2,158,903 | Knobell | May 16, 1939 |
| 2,161,371 | Mees | June 6, 1939 |
| 2,234,717 | Altman et al. | Mar. 11, 1941 |
| 2,261,532 | Tonnies | Nov. 4, 1941 |
| 2,388,609 | Ericsson | Nov. 6, 1945 |